Oct. 18, 1932.  C. J. BECKWITH  1,883,486

LAMINATED SHEET MATERIAL

Filed July 29, 1930

Inventor:
Charles J. Beckwith
by Roberts, Cushman & Woodberry
Attys.

Patented Oct. 18, 1932

1,883,486

UNITED STATES PATENT OFFICE

CHARLES J. BECKWITH, OF BROOKLYN, NEW YORK, ASSIGNOR TO JOHNS-MANVILLE CORPORATION, OF NEW YORK, N. Y., A CORPORATION OF NEW YORK

LAMINATED SHEET MATERIAL

Application filed July 29, 1930. Serial No. 471,465.

This invention relates to a composite sheet material, board, or paneling which in general combines practically all of the desirable characteristics previously attained in part by different types of sheet material, wall boards, paneling or the like. This application is a continuation in part of my copending application Serial No. 257,275, filed February 27, 1928.

In general, material provided by the present invention possesses good heat insulating and sound absorptive ability, high structural strength, suitability for interior finish or ability to provide suitable exterior finish and to withstand adverse weather conditions indefinitely, and is sufficiently fire-resistant to permit its employment in modern buildings where substantially all of the materials must be fireproof or semi-fireproof.

The material has a relatively hard, dense exterior surface which, however, is cushioned by a yieldable porous insulating lamina or core and it may be manufactured at a reasonable cost. To permit these desirable results, I bond a face layer or layers of cement-bonded asbestos, which preferably is formed under high pressure and is substantially homogeneous, to a cushioning and insulating layer of porous fibrous material which, for example, may be formed by the felting and/or bonding of woody fibers. Sheet material formed for example of substantially equal amounts of compacted asbestos fiber and Portland cement has long been recognized as having many desirable characteristics, including hardness, high tensile and compressive strength, electric- and fire-resistance, and ability to withstand adverse weather conditions. However, material of this character, particularly when provided in relatively thin panels or sheets, is somewhat brittle and may crack under sharp localized shocks or stresses, as for example, when nailed. Furthermore, this material is relatively expensive to manufacture and is comparatively heavy. On the other hand, fibrous insulating material formed of felted wood or vegetable fibers has high insulating ability, is somewhat soft, ordinarily is readily ignitible, does not provide an attractive finish, does not possess the ability to withstand adverse weather conditions, and has lower tensile and compressive strength than the bonded asbestos.

Accordingly my invention involves the advantageous combination of these materials having complementary characteristics to provide an integrated panel which possesses substantially all of the desirable characteristics of the included laminæ and in addition has further outstanding advantages, possessing, for example, nail retaining qualities which are superior to either the bonded asbestos sheet alone or the fiber board slab or sheet alone, also being readily cut or formed and adapted to maintain its shape when thus worked. Furthermore, the employment of relatively thin layers of bonded asbestos with a relatively thick layer of porous fibrous material permits the provision of paneling which may have a cost and weight much lower than a solid panel of compacted asbestos fibers and cement of corresponding dimensions; while, the spacing of the asbestos laminæ and their firm bonding to the fibrous core permits the material to have high structural strength or ability to resist bending or flexure, as well as great strength in the plane of the panel itself. The employment of a relatively soft porous core provides a cushioning layer which permits the panels to withstand severe shocks, blows or localized stresses without shattering in contradistinction to the somewhat brittle characteristics of the bonded asbestos alone.

Paneling of this character is unique in that it is adapted to employment in interior partitions which may have a very small thickness and which may have studs spaced at unusually great distances from each other. The studs or supporting frame elements which extend along the margins of the panels may be of smaller cross section than those ordinarily employed and yet the complete wall may have as high or higher structural strength than that attained by prior conventional modes of construction. Furthermore, the bonded asbestos face layers provide an attractive finish without the need for adding other materials, such as plaster, superposed wood paneling or the like. The employment of my improved panel for interior partitions in this manner is particularly advantageous in office buildings where floor space is valuable and rents are relatively high, since it permits a material increase in the amount of useful floor space within a building of given size, while providing relatively strong partitions which afford suitable sound insulation and do not require expensive additional finishing materials or treatments.

Another important use of my improved paneling is for small buildings such as garages, camps, or the like where a single layer of the paneling may provide the total thickness of the wall between studs or frame elements, while firmly bracing the latter; furthermore, the asbestos cement face layers provide a suitable exterior finish and a satisfactory interior finish, and the intermediate porous core afford excellent heat insulation.

Another advantageous use of my improved paneling is for drying chambers where insulating ability is essential and where the high structural strength of the paneling both in its own plane and against flexure or bending is advantageous, since substantially less framing is necessary than with other types of material now in use.

In the accompanying drawing.

Figure 1:
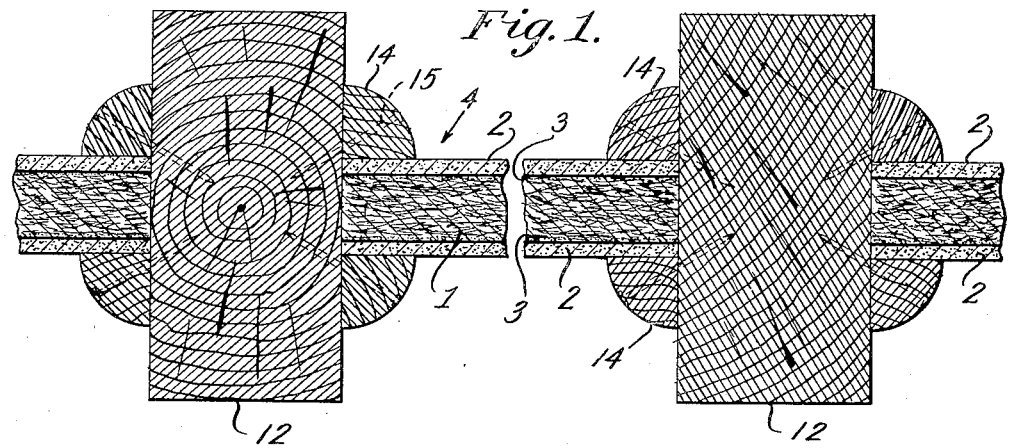
Fig. 1 is a broken cross-sectional view of a typical wall in which my paneling is employed, for example, to provide an interior partition.

In accordance with this invention, a central relatively thick lamina 1 of porous fibrous material may be formed in any suitable manner; for example, this material may be formed of felted coarse wood fibers, which are also held together with a suitable binder which may be either the gummy content of the wood and/or an added ingredient, such as a resinous composition. The binder, whether natural or added, preferably is restricted in quantity so that numerous voids are left between the fibers, and the resulting fiber board is somewhat soft and compressible, and has numerous surface irregularities. Obviously, if desired, many other fibrous sheets may be employed, such as celotex, i. e. sheet material which is composed of bagasse fibers with a suitable binder, and when herein I refer to this fibrous material as "woody" or "ligneous" in character, I intend thereby to include all such vegetable fibrous substances as exhibit characteristics generally similar to those of the materials above specifically mentioned. This core material may be relatively inexpensive and therefore may permit the manufacture of a given over-all thickness of finished board at a reasonable cost. Furthermore, it provides high heat insulating ability and good sound absorptive qualities. However, perhaps the chief advantage in employing core material of this character between the hard surface layers is greatly to reduce the frangibility of the product: whereas a solid board of asbestos cement or the like is likely to break or crack, if subjected to a localized stress or sharp blow.

The outer layers or surface strata 2 preferably are formed of a bonded asbestos layer. for example a mixture of substantially 50% of Portland cement and 50% asbestos fibers formed under relatively high pressure, for example, in accordance with the process disclosed in Patent No. 979,547, granted to Charles L. Norton. Accordingly, the bonded asbestos formed in this manner may have the ability to withstand relatively high tensile and compressive stresses, and may be substantially homogeneous, i. e., may be free from any "grain" or stratification and provide substantially uniform strength in all directions. The asbestos fibers and cementitious matrix as thus compacted provide a relatively smooth hard surface, which is not readily scratched and which affords excellent weather protection, but which has numerous fine pores adapted to receive paint or cement.

Preferably a suitable water-resistant agglutinant such as a casein glue or a high grade animal glue may be employed to bond the surface strata to the insulating lamina. For this purpose one or both of the surfaces which are to be disposed in adhesive engagement may be coated with the moist agglutinant 3 and the layers may then be superposed, for example, one layer of insulating material being disposed between outer face sheets of the bonded asbestos and suitable pressure being applied until the agglutinant has at least initially set. For example a pressure of from 25 to 100 lbs. per square inch may be employed for one-half hour or longer. In commercial production a plurality of sheets as thus originally disposed in adhesive engagement may be superimposed and subjected to pressure in a common press. After the material is removed from the press the agglutinant may be permitted further to dry or to complete its setting by permitting the drying of the material at ordinary room temperature for at least a period of several hours.

Preferably the face layer may have a relatively small thickness in comparison with the intermediate lamina or core, for example, the latter may have a thickness of the order of one-half inch to one inch and the face laminae may each have a thickness of substantially one-eighth of an inch. For certain purposes, especially when an unusually thick panel or slab is desired, it may be preferable to employ a plurality of layers or sheets of bonded asbestos with the fibrous core sheets therebetween.

The cooperative effect of the somewhat yieldable fibrous material and the outer sheets of relatively strong, dense, hard but somewhat brittle bonded asbestos is especially advantageous due to the cushioning effect of the fibrous material and its ability to conform to the deflection of the face sheets under major stresses. The relatively strong face sheets are disposed at the surface of the board where bending causes high unit stresses which may be strongly opposed by the face sheets under slight deflection; the yieldability of the intermediate material permits this deflection and permits the maximum advantage to be obtained, in a panel of relatively light weight, from the resistance of the bonded asbestos to tensile and compressive stresses. It is generally recognized that bending of laminated sheets often cause a breaking down of the agglutinant which holds the sheets in superposed relationship and a resultant relative slipping of the sheets and weakening of the laminated material. The yieldability of the core of my composite board is particularly advantageous in avoiding such a result and in permitting commercially feasible bonding layers to hold the sheets properly united under major bending stresses, such stresses being yieldably opposed, cushioned, and distributed, and any tendency to distinct localized bending which might result in the breaking of the face strata being avoided. Accordingly, the intermediate cushioning layer permits the opposite sheets to deflect a suitable amount under bending so that their stress resisting qualities may be taken advantage of without casting an undue strain upon the bonding layers 3 as would be the case were the core layer or lamina to be substantially rigid or non-yieldable. Furthermore, the cushioning effect of the porous core material is particularly advantageous in providing the composite board with high resistance to mechanical shocks and thus permitting its satisfactory nailing, and particularly the nailing of the same close to its edges, or the hitting of the same with a hammer without resultant cracking or shattering. Furthermore the employment of the soft intermediate layer in conjunction with the outer relatively dense and somewhat brittle surface strata provides material which may have much better nailing qualities and nail holding qualities than either the asbestos cement or the relatively soft insulating sheet alone, and the composite material is adapted more readily to be cut in irregular form with irregular edge projections, cut-out corner portions or the like and to retain its shape when thus formed or worked.

Fig. 1 illustrates one typical, advantageous employment of the resulting paneling for an interior partition. For this purpose studs 12 which may have a relatively small cross section, for example being 3" by 1½", may be spaced at relatively great distances from each other, for example, at distances which may be at least twice the normal spacing of such frame elements. The panels 4 which are formed in the manner described above may then be disposed between the studs, being held in place by retaining strips 14 through which diagonal nails 15 may extend into the studs. This arrangement permits the provision of a wall or partition which has high structural strength, not only with ability to resist bending or flexure but also with high strength in the plane of the wall, the material providing a particularly effective bracing action which is comparable to that provided by the employment of diagonal braces between studs in the conventional construction of small dwellings. Since the studs may have a smaller depth or dimension transversely of the wall than is conventionally required, and since the panels need not be applied to the faces of the studs but are disposed therebetween, the resulting partition may have a thickness which may be of an order of substantially one-half that ordinarily required. The exterior laminæ of the panels provide a dense, smooth, finished surface which does not require the application of additional surfacing material, although it may readily be painted, or sprayed with a cellulosic solution, if desired. Furthermore, the intermediate laminæ provides suitable heat insulation and sound absorption. The surface finishing of the studs and retaining strips is all that is necessary to permit the completion of a partition having satisfactory characteristics for interior use. Accordingly, partitions constructed of my improved paneling may be very rapidly erected and completed, requiring substantially less framing and less labor in the erection of frame elements or studs than is usually involved and permitting a distinct economy in floor area.

Obviously panels of this character may be employed with similar advantage upon the exterior of walls or buildings, such, for example, as garages, hangars, and the like, (Fig. 3), the bonded asbestos face laminæ upon the exterior of the building providing excellent weather resistance and retaining a satisfactory appearance and permanent protection against the attacks of weather; while the intermediate laminæ provides excellent heat insulating ability, and the inner laminæ provides a relatively smooth surface that is satisfactory in almost any environment, and has marked ability to resist scratching or denting.

Figure 2:
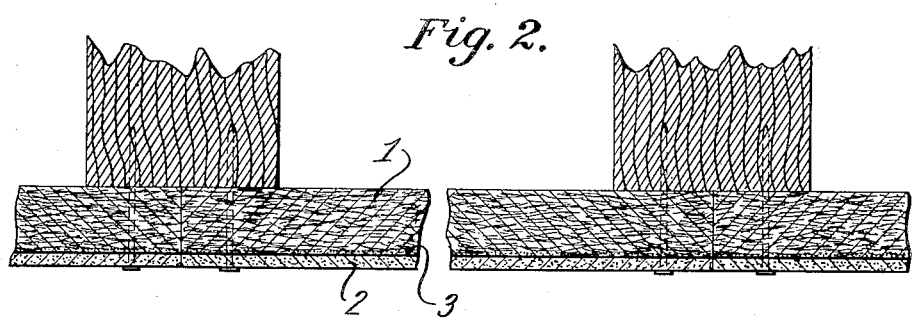
Fig. 2 is a sectional view of a ceiling construction which is provided with a modified form of my paneling having a single face layer of asbestos cement.

Fig. 2 illustrates a modified form of my invention wherein but a single face layer of asbestos cement is firmly bonded to a thick sheet or porous insulating material. Such material has excellent nailing qualities and, for example, is particularly satisfactory in ceilings where, as shown, the asbestos cement layer provides a suitable ceiling finish and the soft insulating layer provides heat and sound insulating and cushions the face layer.

Material of the character disclosed and described herein is adapted to a wide variety of uses and to undergo unusually severe service conditions such, for example, as exposure to severe weather conditions or chemical reactions, or exposure to relatively high heats for prolonged periods of time, as for example in enclosed drying chambers. Furthermore, the material by possessing suitable faces for either exterior or interior finish permits the rapid erection and completion of walls, either interior or exterior, at a relatively low labor cost. This advantage is enhanced by the high structural strength of the material which greatly braces and aids the frame members or studs in supporting the imposed loads, thus permitting the employment of a much smaller number of frame elements than ordinarily would be necessary and also permitting the same to be made in smaller cross-sectional dimensions.

Furthermore panels of the type disclosed herein, while strong, are capable of deflection, being adapted to use where they are subjected to shocks and/or vibrations as in floors, supports for machinery, etc. The relative insensibility of this material to moisture and its lack of any tendency to warp makes it highly satisfactory for use in doors, especially in installations where the opposite faces of the doors are subject to different temperature conditions. The face sheets are adapted to withstand high temperatures and substantially seal the porous core so that sufficient oxygen to support combustion can only reach the core fibers with difficulty. Accordingly ignition of even an exposed edge of the core lamina is difficult.

Figure 3:
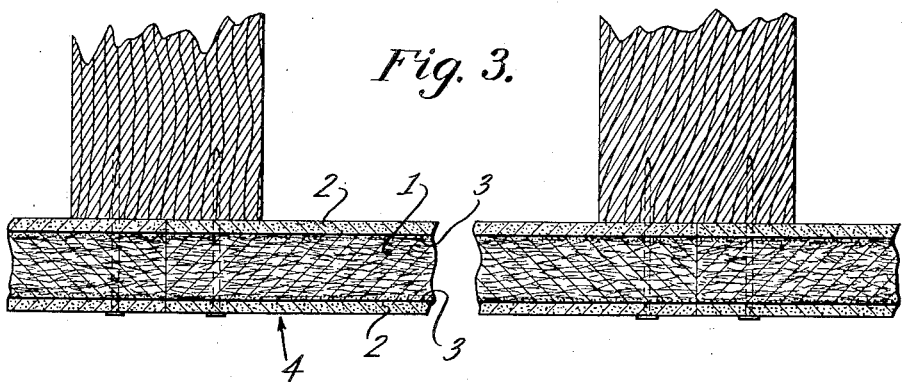
Fig. 3 is a sectional detail of my improved paneling, as used in a wall.

The cutting, sawing, and boring of the composite board may be readily accomplished with tools similar to those employed in working hard wood and with a corresponding facility, the nailing of the composite material may be more readily accomplished than in the case of many woods, while, as shown in Fig. 3, nailing within a fraction of an inch of the edge of the sheet may be done without liability of cracking as would be the case with wood.

I claim:

1. Composite board comprising face laminæ of densely compacted Portland cement and asbestos fibers providing material of high compressive and tensile strength, the face laminæ being capable of limited flexing to oppose major stresses, an intermediate cushioning lamina of felted fibrous insulating material adhesively bonded to the face laminæ so that the board acts as a unit in resisting stresses, the cushioning lamina having a yieldability sufficient to permit it to conform to the flexing of the face laminæ, whereby breaking down of the bonding connection between the laminæ is avoided even under high bending stresses.

2. Composite board comprising relatively thin face laminæ of densely compacted Portland cement and asbestos fibers providing material of high compressive and tensile strength, the face laminæ being capable of limited flexing to oppose major stresses, a relatively thick, intermediate cushioning lamina of porous insulating material formed of felted fibers, and layers of bonding material penetrative of the faces of the cushioning lamina and the adjoining faces of the face laminæ so that the board acts as a unit in resisting stresses, the cushioning lamina having a yieldability sufficient to permit it to conform to the flexing of the face laminæ, whereby breaking down of the bonding layers between the laminæ is avoided under high bending stresses.

3. Composite board comprising face laminæ of a compacted mass of substantially equal weights of Portland cement and asbestos fibers providing material of high compressive and tensile strength and having substantially uniform stress-resistance in all directions, the face laminæ being capable of limited flexing to oppose major stresses, an intermediate cushioning lamina of felted fibrous insulating material adhesively bonded to the face laminæ so that the board acts as a unit in resisting stresses, the cushioning laminæ having a yieldability sufficient to permit it to conform to the flexing of the face laminæ, whereby breaking down of the bonding connection between the laminæ is avoided even under high bending stresses.

4. Composite board of the class described comprising a relatively thin and stiff preformed face lamina of Portland cement and asbestos fibers densely compacted by high pressure providing a substantially homogeneous material of high compressive and tensile strength, said lamina being capable of limited flexing to oppose major stresses, a preformed cushioning lamina of felted woody fibrous insulating material less dense than but relatively thicker than the face lamina, and bonding means adhesively uniting the face lamina to the cushioning lamina, the cushioning lamina having a yieldability sufficient to permit it to conform to the flexing of said face lamina whereby breaking down of the bonding connection between the laminæ is avoided and whereby the relatively thick cushioning lamina may act as a yieldable backing for the face lamina when the board is secured as by nailing to supporting frame members, the cushioning lamina and the face lamina acting as a unit in resisting stresses.

Signed by me at New York, New York, this 25th day of June, 1930.

CHARLES J. BECKWITH.